(12) United States Patent
Jarvis

(10) Patent No.: US 9,988,115 B2
(45) Date of Patent: Jun. 5, 2018

(54) FLOATING HITCH AND CASTER-TRAILER TRANSPORT SYSTEM

(71) Applicant: Charles Dwight Jarvis, Jonesboro, GA (US)

(72) Inventor: Charles Dwight Jarvis, Jonesboro, GA (US)

(*) Notice: Subject to any disclaimer, the term of this patent is extended or adjusted under 35 U.S.C. 154(b) by 0 days. days.

(21) Appl. No.: 15/264,140

(22) Filed: Sep. 13, 2016

(65) Prior Publication Data

US 2018/0072360 A1 Mar. 15, 2018

(51) Int. Cl.
| | |
|---|---|
| *B62D 63/06* | (2006.01) |
| *B60D 1/01* | (2006.01) |
| *B60G 11/14* | (2006.01) |
| *B60G 13/06* | (2006.01) |
| *A01K 1/10* | (2006.01) |
| *A01K 5/01* | (2006.01) |
| *B62D 63/08* | (2006.01) |
| *B60D 1/46* | (2006.01) |
| *B60D 1/36* | (2006.01) |

(52) U.S. Cl.
CPC .............. *B62D 63/068* (2013.01); *A01K 1/10* (2013.01); *A01K 5/01* (2013.01); *B60D 1/01* (2013.01); *B60D 1/465* (2013.01); *B60G 11/14* (2013.01); *B60G 13/06* (2013.01); *B62D 63/08* (2013.01); *B60D 1/36* (2013.01)

(58) Field of Classification Search
CPC ......... B62D 63/068; B60D 1/36; B60D 1/465
USPC ....................................................... 280/789
See application file for complete search history.

(56) References Cited

U.S. PATENT DOCUMENTS

| | | | | | |
|---|---|---|---|---|---|
| 2,180,621 | A | * | 11/1939 | Thomason | .............. B66F 19/00 254/4 R |
| 2,332,326 | A | * | 10/1943 | Lex | ...................... B62D 63/062 280/149.2 |
| 2,931,450 | A | * | 4/1960 | Bear | ......................... B62B 3/06 180/14.1 |
| 3,622,178 | A | * | 11/1971 | Tantlinger | ................. B60S 9/16 280/416.1 |
| 6,254,132 | B1 | * | 7/2001 | Lindsay | ................. B62D 21/02 280/789 |
| 8,360,460 | B1 | | 1/2013 | Jarvis | |
| 8,608,211 | B1 | | 12/2013 | Jarvis | |
| 8,844,166 | B2 | | 9/2014 | Jazdanian | |
| 8,876,148 | B2 | * | 11/2014 | Sartini | ..................... B60G 9/00 280/656 |

(Continued)

*Primary Examiner* — Faye M Fleming

(74) *Attorney, Agent, or Firm* — Crose Law LLC; Bradley D. Crose

(57) ABSTRACT

The apparatuses and methods disclosed herein may be towed forwards and backwards by a motor vehicle. Thus, implementations of the transport device disclosed herein may have functions akin to a goose-neck trailer, yet may provide easier, more efficient and/or more cost effective transportation and loading functions over prior art trailer transportation systems. Furthermore, in some implementations, the transport device disclosed herein includes at least three, non-aligned wheels and therefore can function like a cart. Still further, in some implementations, the transport device disclosed herein can have the functions of a wagon, yet still back and maneuver like a trailer. In some implementations, the transport device includes a frame for positioning hay for feeding live stock.

11 Claims, 7 Drawing Sheets

(56) References Cited

U.S. PATENT DOCUMENTS 9,327,747 B2 5/2016 Jarvis
9,623,778 B2 * 4/2017 Jarvis .................. B62D 63/064

* cited by examiner

Fig. 2A,1     Fig. 2B,1
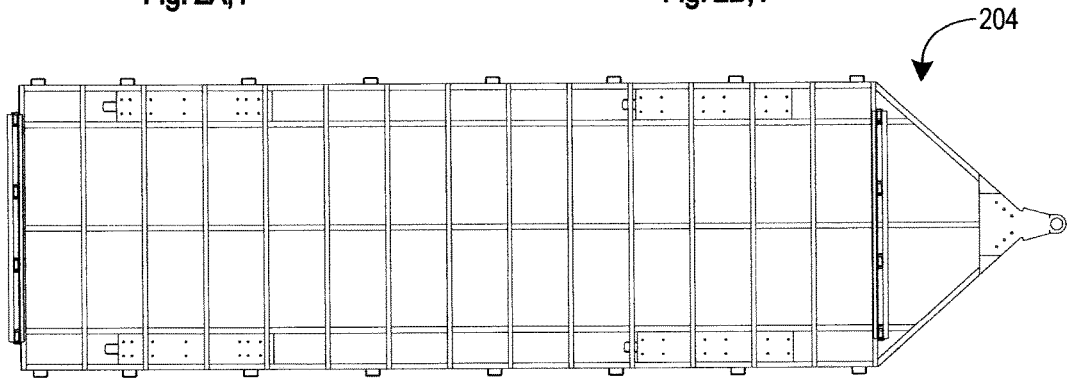
Fig. 2C
Fig. 2A,2     Fig. 2B,2
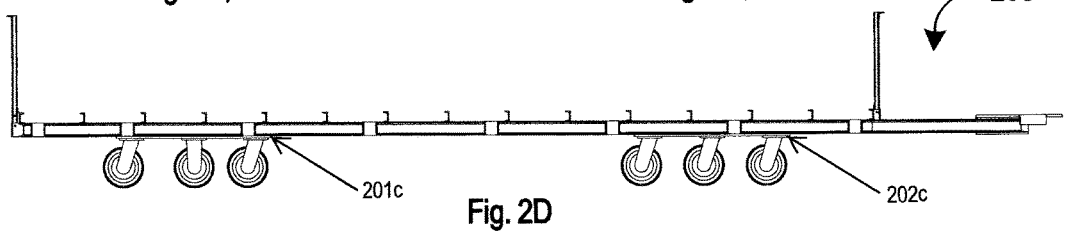
Fig. 2D
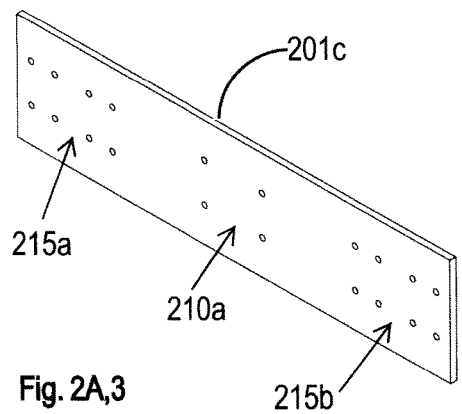      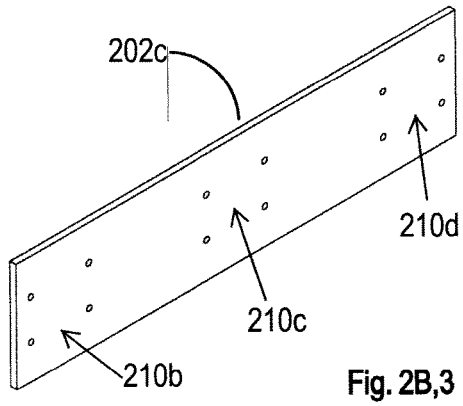
Fig. 2A,3     Fig. 2B,3

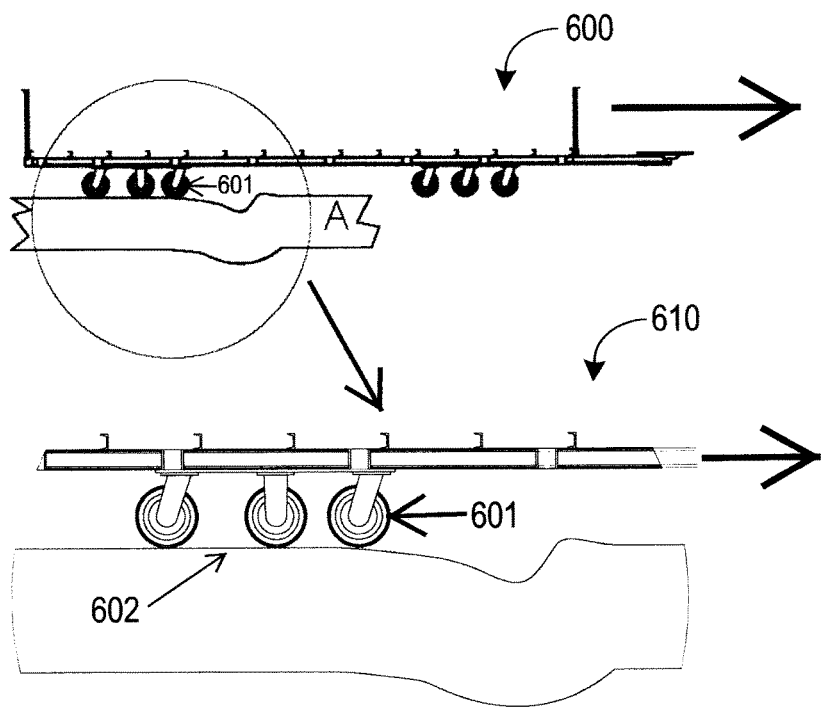
Fig. 6A
Fig. 6B
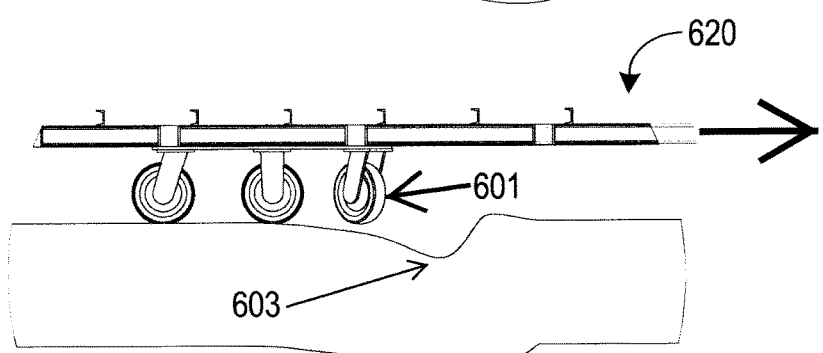
Fig. 6C
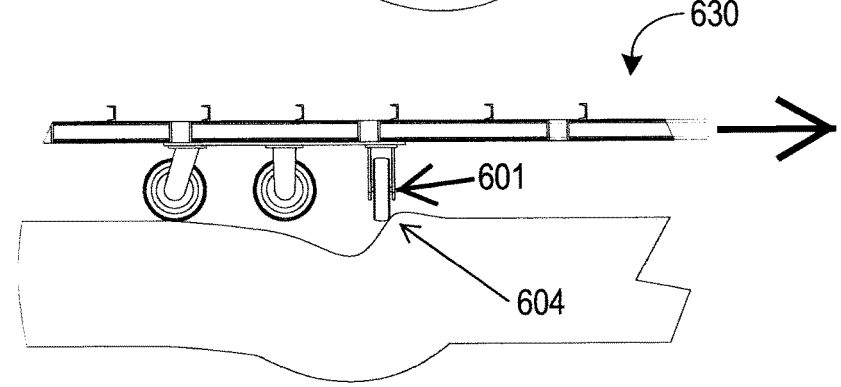
Fig. 6D

FLOATING HITCH AND CASTER-TRAILER TRANSPORT SYSTEM

CROSS-REFERENCE TO RELATED APPLICATION(S)

The present non-provisional patent application references the following patents: (1) U.S. Pat. No. 8,360,460, entitled "Floating Hitching System" and issued Jan. 29, 2013; (2) U.S. Pat. No. 8,608,211, entitled "Quick Connect/Disconnect Rope hitch" and issued Dec. 17, 2013; (3) U.S. Pat. No. 9,327,747 "Transport system" and issued May 3, 2016; and (4) U.S. Pat. No. 8,844,166, entitled "Transport System" and issued May 21, 2013, all of which are incorporated herein by reference in their entirety.

FIELD OF THE INVENTION

The technology described herein relates generally to devices, systems, and methods for transport systems. More specifically, this technology relates to a device, system, and method for a single frame transport system including a bed, a frame support, a single hitching ring, and multiple swivel and rigid casters.

BACKGROUND OF THE INVENTION

Some transports systems are known in the background art. The referenced patents disclose a transport system where the front of a trailer is fitted with a swivel caster or swivel casters and the tongue has a single hole that may float up and down a vertical, hitching rod. This is illustrated best in FIG. 4 of U.S. Pat. No. 8,360,460 Patent entitled "Floating Hitching System" and issued Jan. 29, 2013.

The ability of the tongue to float up and down on the vertical rod allows the caster wheel to follow the terrain which avoids generating a rut in a lawn or damage to the wheel when an obstacle is struck. This is illustrated best in FIGS. 5A and 5B of U.S. Pat. No. 8,360,460 Patent entitled "Floating Hitching System" and issued Jan. 29, 2013.

The swivel caster/tongue transport system has the handling characteristics of a standard trailer, particularly the ease of backing compared to a wagon.

The swivel caster/tongue transport system applies little weight on the towing vehicle. The weight is distributed between the wheels of the trailer.

FIGS. 18, 19 and 20 of U.S. Pat. No. 8,608,211, entitled "Quick Connect/Disconnect Rope hitch" and issued Dec. 17, 2013, illustrate the use of various adapters that may be attached to the boom of a tractor-three-point hitch for towing of a transport using various hitching techniques.

The foregoing information reflects the state of the art of which the inventor is aware and are tendered with a view toward discharging the inventor's acknowledged duty of candor in disclosing information that may be pertinent to the patentability of the technology described herein. It is respectfully stipulated, however, that the foregoing information does not teach or render obvious, singly or when considered in combination, the inventor's claimed invention.

BRIEF SUMMARY OF THE INVENTION

In various exemplary embodiments, the technology described herein provides a device, system, and method for a single frame transport system including a bed, a frame support, a single hitching ring, and multiple swivel and rigid casters.

In one exemplary embodiment, the technology described herein provides a transport system including: a bed; a single longitudinal frame support to support the bed from an underside surface of the bed; a single hitching ring extensible outwardly from the single longitudinal frame support; and a plurality of swivel and rigid casters to support the longitudinal frame from an underside surface of the frame. The single longitudinal frame support, single hitching ring, and multiple swivel casters, rigid casters and/or conventional axle/wheels collectively form (1) a single hitching ring, (2) at least three swivel or rigid casters, and (3) a single frame transport system.

In at least one embodiment, the transport system also includes a lifting, hitching pin assembly, coupled to the single hitching ring and with which to couple the transport device to a towing vehicle. The hitching assembly includes: a pin; a lifting mechanism; a boom coupled to the lifting mechanism and configured to lift the pin; and a manual interface with which to operate the lifting mechanism. The pin is lowered or lifted by operation of the lifting mechanism and the coupled boom to shift between a lowered, un-hitched position and a raised hitched position to tow.

In at least one embodiment of the transport system, the single hitching ring further includes an orifice sized to receive the hitching pin to couple with the hitching assembly pin when engaged.

In at least one embodiment, the transport system also includes a hitch configured to mount to the lift of a towing vehicle, the hitch configured to couple to the hitching assembly.

In at least one embodiment of the transport system the hitch further includes: a boom; a hitch pin disposed vertically within the boom and operable to move up and down vertically and configured to be positioned in an UP or DOWN position to match the terrain; and a control lever or other mechanism to control the vertical position of the hitch pin.

In at least one embodiment, the transport system also includes at least two rigid casters or a conventional wheel/axle assembly and at least one swivel caster—not on the line between the two swivel casters on aligned with the axle—to support and provide mobility of the frame.

In at least one embodiment, the transport system further includes a plurality of auxiliary plates and a guide mechanism to allow the swivel caster to ride up and down vertically to match depressions in the terrain.

In at least one embodiment, the transport system also includes a terrain following system. The terrain following system includes: at least two auxiliary plates welded to the single longitudinal frame; at least one plate for mounting a swivel caster; at least four positioning rods; and a pressure mechanism to provide downward pressure on the swivel caster mounting plate to follow depressions in the terrain.

In at least one embodiment, the transport system also includes a stock feeding system. The stock feeding system includes: at least two sides from which stock may have access to the bales of hay; at least one frame mechanism to limit access of stock to the hay for feeding purposes only; and a frame and support mechanism to maintain the hay off the ground to prevent damage from stock and/or standing water.

In at least one embodiment, the transport system also includes a dual flotation system. The single hitching ring is free to move up and down on the hitching pin. The boom/ hitching pin may be moved up and down to match the terrain via a manual interface with the lift mechanism of the tow vehicle.

In at least one embodiment of the transport system the terrain following system also includes a hydraulic system in which all the hydraulic cylinders of each swivel caster are plumbed in series to a single pressure source so that each swivel caster in contact with the ground transmits downward pressure to swivel caster wheels that are over a depression in the terrain.

In at least one embodiment of the transport system the terrain following system also includes a compression spring system in which compression springs between an auxiliary plate and a swivel caster mounting plate provides downward pressure so that swivel caster wheels follow depressions in the terrain.

In at least one embodiment of the transport system the terrain following system also includes a positioning rod system so that the mounting plates of swivel casters are held in parallel and positioning alignment with the longitudinal frame while permitting up and down movement of the swivel caster.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which:

FIGS. 2A1, 2A2, 2A3, 2B1, 2B2, 2B3, 2C and 2D includes a top planar and side view of the caster-trailer transport device and illustrates an example implementation of caster mounting plates, according to an embodiment of the technology described herein;

FIG. 3 is a perspective view of a floating, caster-trailer hitch ring used in the caster-trailer transport device, according to an embodiment of the technology described herein;

FIGS. 6A-D are side views of the caster-trailer and illustrate the primary, operational malfunction of a swivel caster on a caster-trailer.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a device, system, and method for a single frame transport system including a bed, a frame support, a single hitching ring, and multiple swivel and rigid casters.

Various implementations of this disclosure provide apparatuses and methods for transporting multi-ton loads over rough terrain such as a pasture or hay field. The implementations of the transport device disclosed herein may be towed by a motor vehicle, including—but not limited to—a conventional farm tractor. Thus, implementations of the transport system disclosed herein may have functions akin to goose-neck trailer/tow truck systems, yet may provide easier, more cost effective and more efficient transportation over rough terrain, loading functions, and stock feeding functions. Implementation of the transport device disclosed herein also may be cheaper due to distribution of load over multiple casters and to counter-lever design permitting the frame of a caster-trailer to be much lighter and cheaper than the equivalent capacity goose-neck trailer. The transfer of weight from the tow vehicle to the caster trailer permits a much lighter and cheaper tow vehicle to be used with the caster-trailer than the comparative fifth-wheeler or tractor truck required for a goose-neck trailer. Furthermore, in some implementations, the transport device disclosed herein includes four wheels or four sets of wheels located at the four corners and therefore can function like a cart or a wagon while maintaining the handling (backing) characteristics of a trailer.

Figure 1A:
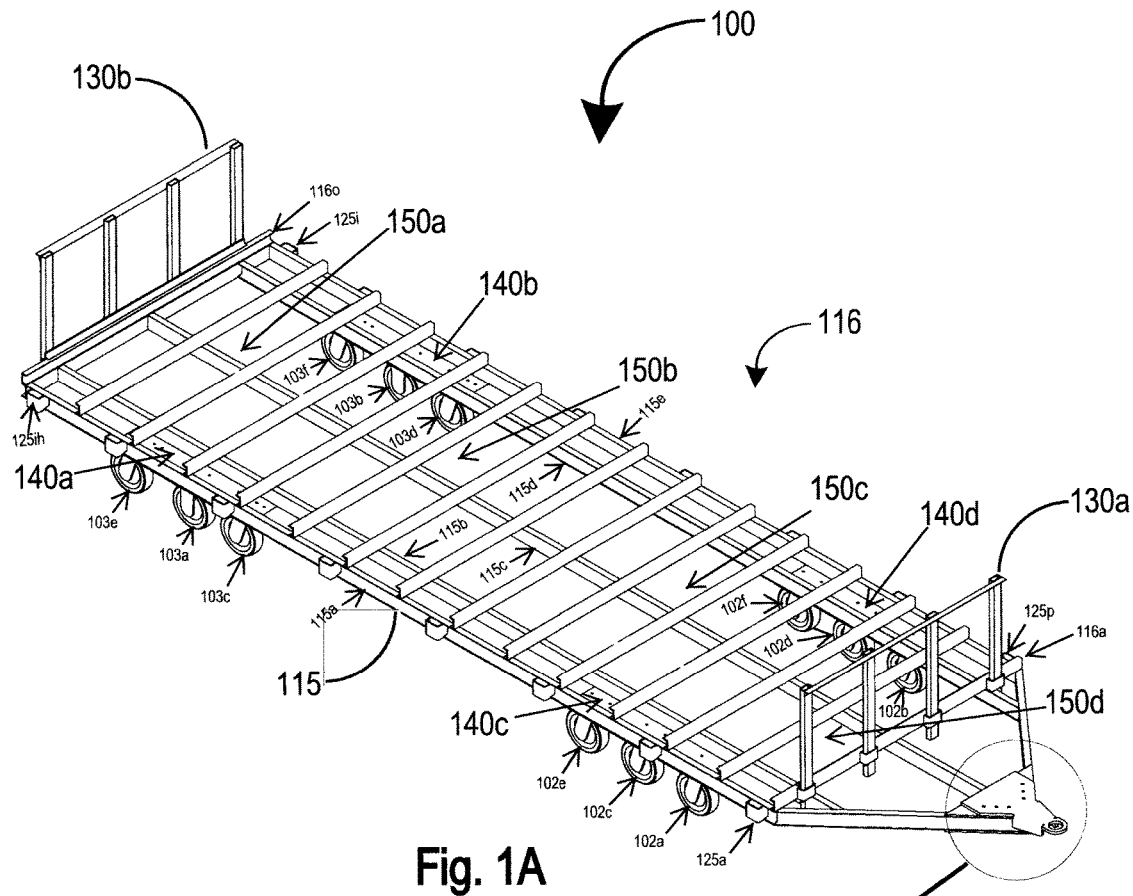
FIGS. 1A and 1B are front perspective views and illustrate, in particular, an example implementation of a caster-trailer transport device according to the principles of the present disclosure, according to an embodiment of the technology described herein.
Figure 1B:
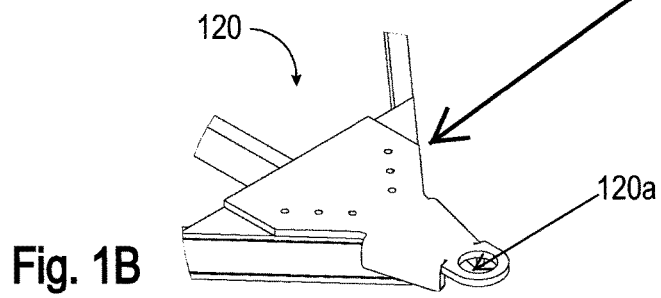

FIGS. 1A and 1B illustrate an example implementation of a caster-trailer device 100 according to the principles of the present disclosure for transporting round bales of hay (typically between five and six feet in diameter, five feet long and weighing between 500 and 1200 pounds depending upon size, type of hay, moisture content, etc.). Such an example implementation device has two primary characteristics. First, the tongue of a caster-trailer may have a hitch assemble 120 that provides a round hitch hole 120a. Second it may have swivel casters 102a-f (from one to as many as needed to support the specified load) on the front of the caster-trailer. The back of the caster trailer may be supported by conventional wheels or by casters (again, the number depending on the quantity needed to support the load). Some of the casters 103a-f on the back may be swivel or rigid, but at least two opposing casters 103a, b may be rigid to maintain side to side stability. The transport device 100 comprises a front end tongue assembly 120, a frame 115 of 115a-e longitudinal channels, bed assembly 116 of cross-channels 116a-o, restraint systems such as gates 130a, b and/or stanchions 125a-x for alternate means (ergo, for example sideboards) of restraining the load, and caster assemblies such as 140a-d. Alternate bed assemblies from expanded metal to metal or wood planking or plywood sheets attached to cross-channels 116a-o by welding, bolts or other fasteners and/or adhesives and in combination with sideboards may be used for transporting alternate loads from bulldozers to peanuts.

FIG. 2 illustrates example implementations of mounting plates for casters needed to assemble transport device 100 according to the principles of the present disclosure. Plates 202a, b, c may be welded or bolted to the front of the frame and may have four-hole pattern 210 with pattern 210 spacing suitable for swivel casters 210a-f. Plates 201a, b, c may be welded or bolted to the back of the frame and may have four-hole pattern 210 with pattern spacing suitable for either swivel casters, rigid casters or a combination of both. Eight-hole patterns 215a, b are combinations of four-hole pattern 210 for the purpose of attaching either a swivel or rigid caster as dictated by the terrain.

Figure 3:
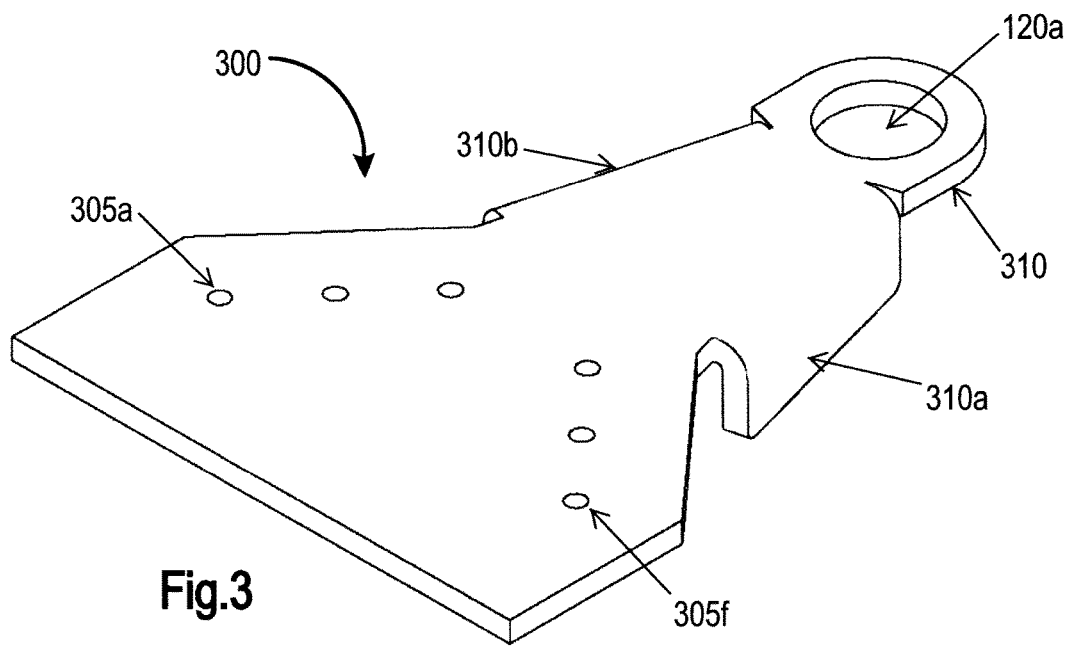

FIG. 3 illustrates an example implementation of a floating caster-trailer hitch 300 according to the principles of the present disclosure. The ring 310 is of sufficient diameter to permit the hitch pin 410, illustrated in FIG. 4, of a tractor-three-point, dual floating hitch to be inserted within the ring. Holes 305a-f permit the hitch to be bolted to frame 115 to create hitch assembly 120. Flaps 310a, b extend downward and may guide the hitch pin 410 into hole 120a.

Figure 4:
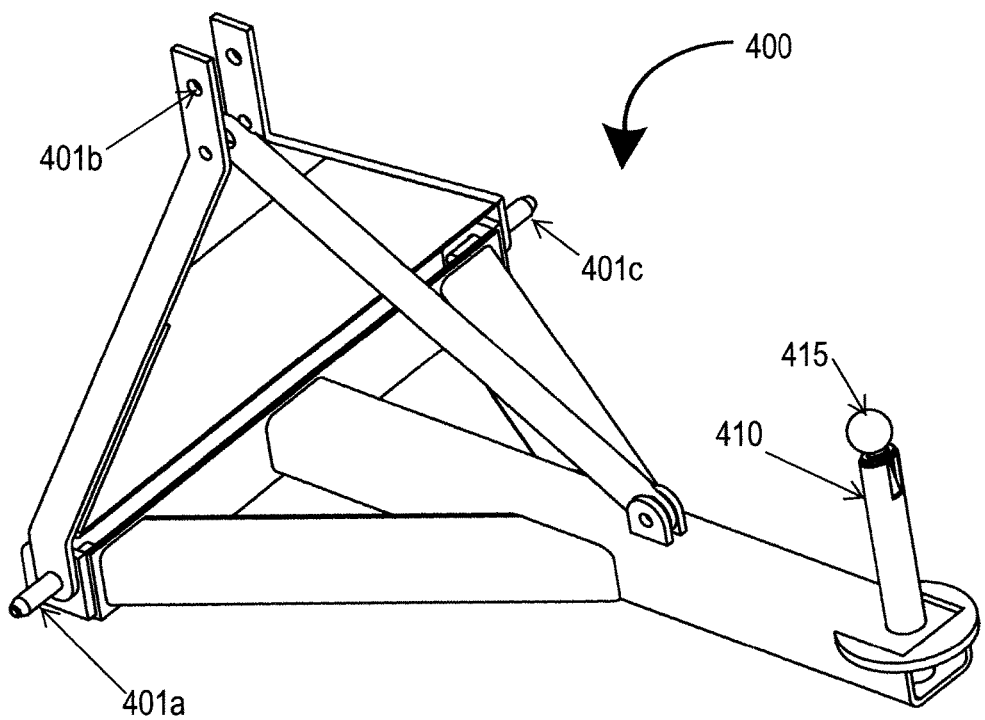
FIG. 4 is a perspective view of an example implementation of a tractor-three-point, dual floating hitch, according to an embodiment of the technology described herein.

FIG. 4 illustrate an example implementation of a tractor-three-point (ergo, for example points 401a-c), dual floating hitch according to the principles of the present disclosure. The dual float of assembly 400 arises from the raising and lowering of the tractor-three-point arms using the hydraulic lift mechanism of the tractor and from the sliding of the hitch pin 410 up and down with in caster-trailer hitch ring 310.

Figure 5A:
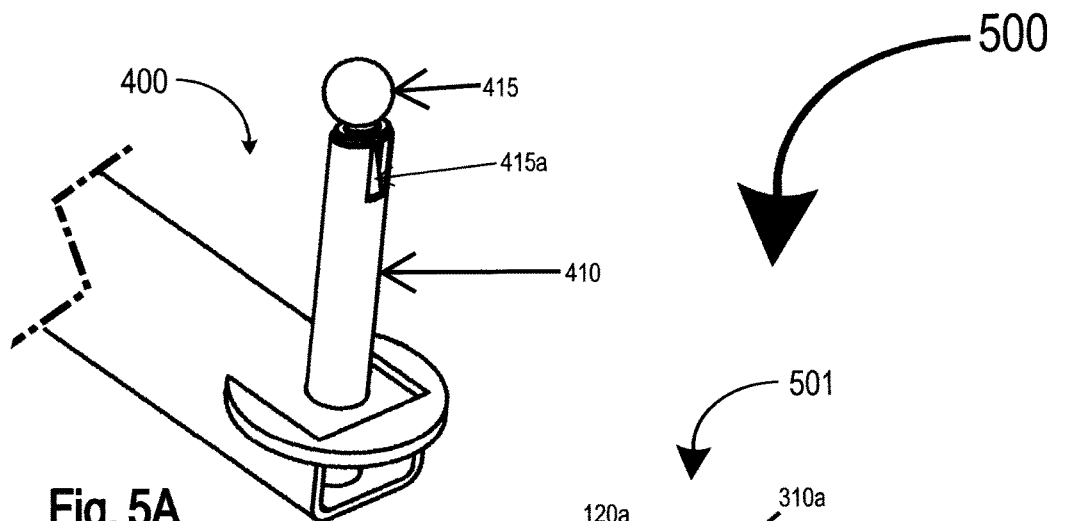
FIGS. 5A-C are front perspective views and illustrate the hitching sequence of a tractor-three-point, dual floating hitch pin to a floating caster-trailer hitch ring, according to an embodiment of the technology described herein.
Figure 5B:
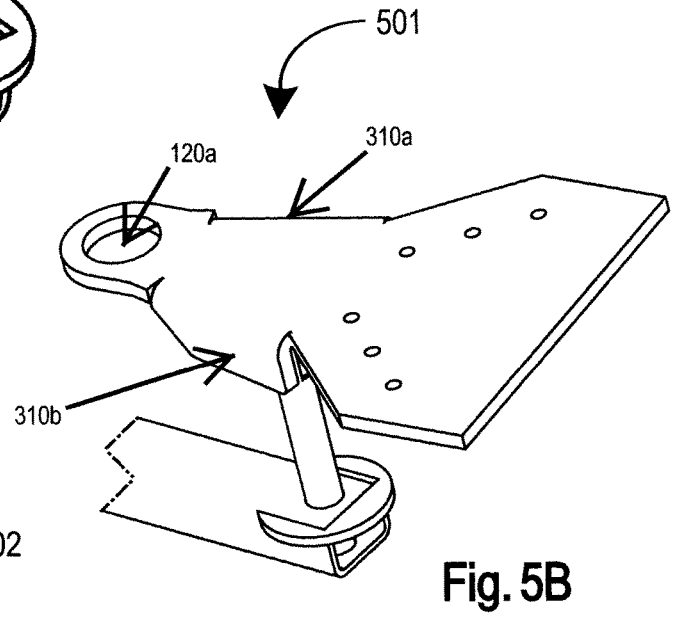
Figure 5C:
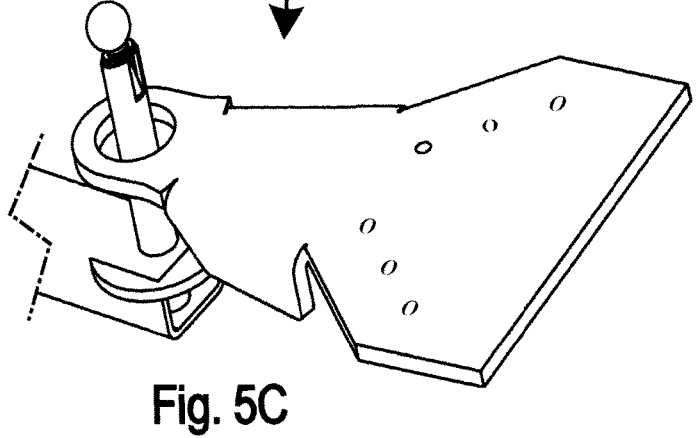

FIGS. 5A to 5C illustrate an example implementation of the quick connect, hitching sequence 500 in which the flaps 310a, b of hitch assembly 120 guide the hitch pin 410 into the ring orifice 120a according to the principles of the present disclosure. FIG. 5B illustrates that the hitch pin 410 may be positioned below hitch assembly 120. FIG. 5B shows that hitch pin 410 may be raised up to make physical contact with the underside of hitch assembly 120. The pressure of hitch pin 410 on the underneath side of hitch ring assembly 120 is controlled by the hydraulic lift lever on the tractor for the three-point hitch assemble 400. The tractor may be pulled forward while upward pressure of hitch pin 410 is being maintained. The path of hitch pin 410 is directed by the flaps 310a, b of hitch ring assembly 120 toward ring orifice 120a. Once the hitch pin 410 is within the orifice 120a, the upward pressure on three-point hitch assembly 400 forces the hitch pin 410 up through ring 310 as is illustrated in FIG. 5C. At this point, hitch pin 410 may be raised further to securely connect the caster-trailer to the tractor for towing caster-trailer 100. In this sequence centering sphere 501 helps guide hitching pin 410 up and through the hole 120a. Centering sphere 415 may be installed at an angle and the dimensions of the centering sphere 415 and orifice 120a may be specified so that the sphere shaft 415a may be vertical relative to the orifice 120a in the step, illustrated in FIG. 5B and then turned so that centering sphere 415 cannot pass through orifice 120a in the positioned illustrated in FIG. 5C. Un-hitching may be performed by repeating this process in reverse.

The operational mechanism of a swivel caster may create an interference between the swivel caster and the ground as is illustrated in the operational sequence illustrated in FIGS. 6B to 6D. FIG. 6B illustrates the normal operation of a three swivel caster assembly with the wheels of all three casters in firm contact with level ground 602. If depression 603 is encountered as depicted in FIG. 6C, the leading, swivel caster 601 may rotate freely when it is in the air. If the middle, swivel caster comes down cross wise and contacts hill 604 (as depicted in FIG. 6D), then damage to caster 601 may occur.

Figure 7A:
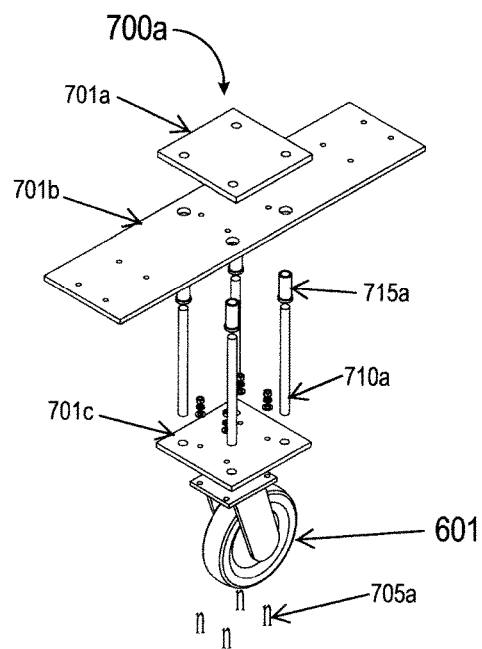
FIGS. 7A-D are perspective views (7A and 7B), a front planar view (7C), and a side view (7D) and illustrate auxiliary plates that mitigate the primary malfunction of a swivel caster on a caster-trailer, according to an embodiment of the technology described herein.
Figure 7B:
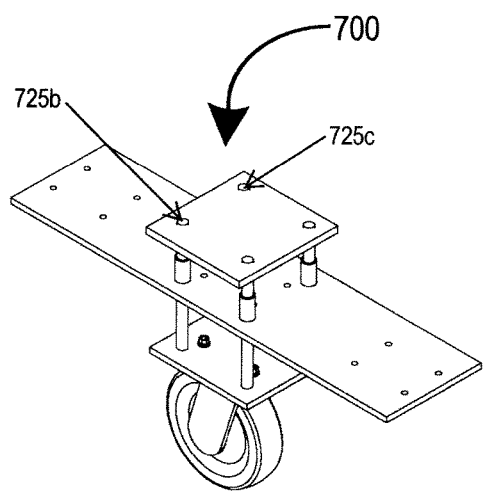
Figure 7C:
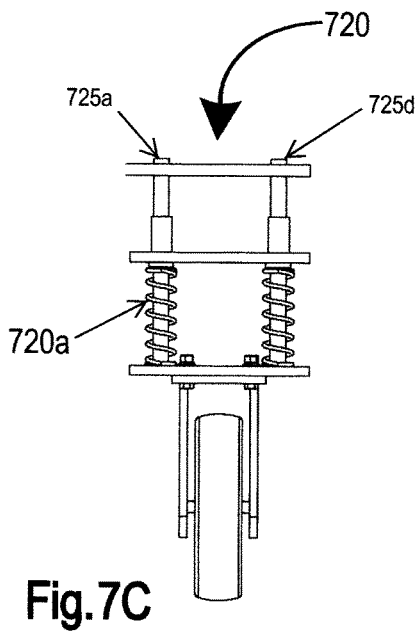
Figure 7D:
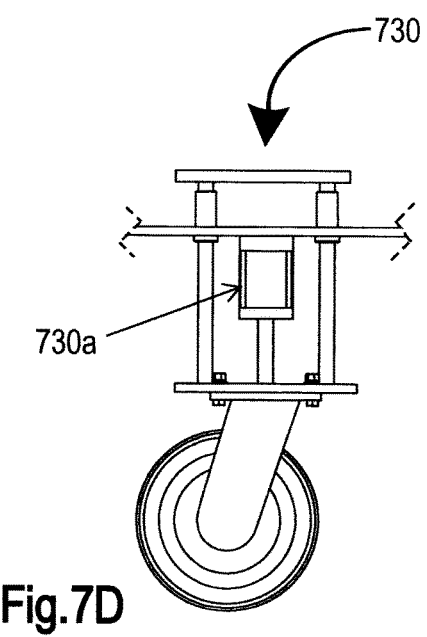

The interference difficulty depicted in FIGS. 6A-D may be avoided by mechanisms that keep the swivel casters, such as 601, in firm contact with the ground. As illustrated in FIGS. 7A-D, the use of two auxiliary plates 701a and c may provide this function. Plate 701c may be attached only to rods 710a-d (only rod 701a is identified to simplify illustration). Rods 701a-d may slide up and down clearance holes in plates 701a and b through bushings 715a-h. (Only bushing 715a is identified and second set 715e-h are not shown to simplify illustration.) Plates 70 1and b are welded to frame 115 so that they may move up and down with frame 115. Plate 701c is free to move up and down, relative to frame 115, and its position may be controlled by rods 710a-d. Stops 725a-d may be used to limit downward movement of plate 701c. Pressure to move plate 701c and swivel caster 601 down when swivel caster 601 encounters a depression in the ground may be provided by various means such as compression springs as illustrated in FIG. 7C or hydraulic piston as illustrated in FIG. 7D. Upward movement of swivel caster 601 may be controlled also by mechanical stops (not shown) of various kinds such as Dowel pins in rods 710a-d below plate 701a. By plumbing all the hydraulic cylinders of each swivel caster together, the pressure from the wheels in contact with the ground provides a downward force on any swivel caster that is over a depression in the terrain.

Figure 8:
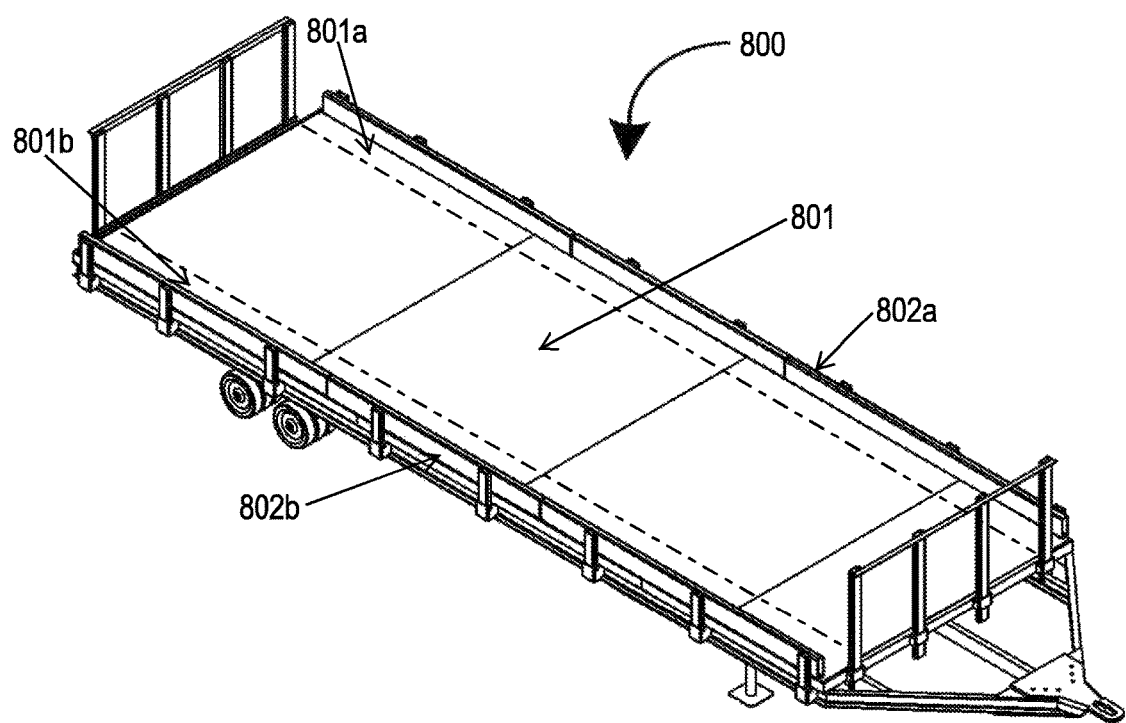
FIG. 8 is a more detailed perspective view illustrating a configuration suitable for feeding cattle.

As illustrated by FIG. 8, the trailer-caster implementation 800 may be configured to feed stock directly from the caster-trailer. The caster-trailer implementation 100 of FIGS. 1A and 1B may be modified for the feeding of stock by attaching suitable surfaces 801, such as expanded metal for example, to rails 116a-o to provide a surface floor onto which bales of hay may be placed. Surface 801 may be perforated, such as is the case with expanded metal, to allow water from rain to pass through to the ground which may reduce mildewing of the hay. Bales may be placed side by side with the cut side directed toward side boards 802a & b. For example typical round bales would be placed with the round side down on the surface and the cut sides extended toward the sides of the caster-trailer in order for stock to stand on the ground along each side of the caster-trailer and access the ends of the bales. Typically, a five feet high-six foot round bale would be centered side to side on the surface leaving approximately one foot between side boards and the end of the bale. Thus stock, cattle for instance, may easily reach the hay and feed from the ground.

The trailer-caster 800 implementation may permit stock to feed directly from caster-trailer 800 with a minimum of waste. When cattle feed, they typically pull a portion of hay out by swinging their heads and then feed on that portion until it is consumed. Then they repeat this process. When cattle feed from a bale on the ground, this portion falls on the ground and may not be completely eaten before the animal pulls out another portion. If the uneaten portion of hay becomes soled from cow urine or feces or wet and mildewed from rain, then cattle will not eat it and this portion is wasted. Sideboards 802a & b and the portions of surface 801 (801a & b for example) between the ends of the bales may provide a trough into which the pulled out portion may fall, keeping the portion off of the ground and readily available for the animal to feed. The size of the caster wheels (typically 12 or 14 inches in diameter) permit surface 801 to be at the proper height for feeding stock. Caster wheels of this size may carry four times the load of an equal diameter pneumatic tire. Thus pneumatic tires must be 3 to 4 times the diameter to carry an equivalent load, and the caster-trailer implementation 800 may be of the proper height for cattle to feed where as the typical goose trailer may not be at the cattle feeding height.

Side boards 801a & b may provide an additional function in that they hold up the ends of two bales loaded end-to-end and cross wise in order to secure the bales onto the caster-trailer when hauling loads of hay from the field. A typical trailer-caster implementation may be seven or eight feet wide. This means the outer ends of the two bales will be elevated so that the weight of the bales may be shifted toward the center line of caster-trailer 800. The downward slope of the bales toward the center also may assist in preventing the bales from falling off the caster-trailer during transit over uneven terrain such as cross wise to the side of a hill.

Reference throughout this specification to "an embodiment" or "implementation" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology disclosed herein and are intended to be covered by the following claims.

What is claimed is:

1. A transport system comprising:
   a bed;
   a single longitudinal frame support to support the bed from an underside surface of the bed;
   a single hitching ring extensible outwardly from the single longitudinal frame support; and
   a plurality of swivel and rigid casters to support the longitudinal frame from an underside surface of the frame; and
   an orifice sized to receive the hitching pin to couple with a hitching assembly pin when engaged;
   wherein the single longitudinal frame support, single hitching ring, and the plurality of swivel and rigid casters collectively form a single frame transport system; and
   a lifting, hitching pin assembly, coupled to the single hitching ring and with which to couple a transport device to a towing vehicle, the hitching assembly comprising:
   a pin;
   a lifting mechanism;
   a boom coupled to the lifting mechanism and configured to lift the pin; and
   a manual interface with which to operate the lifting mechanism;
   wherein the pin is lowered or lifted by operation of the lifting mechanism and the coupled boom to shift between a lowered, un-hitched position and a raised hitched position to tow.

2. The transport system of claim 1, further comprising:
   a hitch configured to mount to the lift of a towing vehicle, the hitch configured to couple to the hitching assembly.

3. The transport system of claim 1, wherein the hitch further comprises:
   a boom;
   a hitch pin disposed vertically within the boom and operable to move up and down vertically and configured to be positioned in an UP or DOWN position to match a terrain; and
   a control lever or other mechanism to control the vertical position of the hitch pin.

4. The transport system of claim 1, further comprising:
   at least two rigid casters or a conventional wheel/axle assembly and at least one swivel caster to support and provide mobility of the frame.

5. The transport system of claim 1, further comprising:
   a plurality of auxiliary plates and a guide mechanism to allow the swivel caster to ride up and down vertically to match depressions in a terrain.

6. The transport system of claim 1, further comprising:
   a terrain following system comprising:
   at least two auxiliary plates welded to the single longitudinal frame;
   at least one plate for mounting a swivel caster;
   at least four positioning rods; and
   a pressure mechanism to provide downward pressure on a swivel caster mounting plate to follow depressions in a terrain.

7. The transport system of claim 6, wherein the terrain following system further comprises:
   a hydraulic system in which a plurality of hydraulic cylinders of each swivel caster are plumbed in series to a single pressure source so that each swivel caster in contact with the ground transmits downward pressure to swivel caster wheels that are over a depression in the terrain.

8. The transport system of claim 6, wherein the terrain following system further comprises:
a compression spring system in which compression springs between an auxiliary plate and a swivel caster mounting plate provides downward pressure so that swivel caster wheels follow depressions in the terrain.

9. The transport system of claim 6, wherein the terrain following system further comprises:
a positioning rod system so that a plurality of mounting plates of swivel casters are held in parallel and positioning alignment with the longitudinal frame while permitting up and down movement of the swivel caster.

10. The transport system of claim 1, further comprising:
a stock feeding system comprising:
at least two sides from which stock may have access to a plurality of bales of hay;
at least one frame mechanism to limit access of stock to the hay for feeding purposes only; and
a frame and support mechanism to maintain the hay off the ground to prevent damage from stock and/or standing water.

11. The transport system of claim 1, further comprising:
a dual floatation system;
wherein the single hitching ring is free to move up and down on the hitching pin; and
wherein the boom/hitching pin may be moved up and down to match a terrain via a manual interface with the lift mechanism of the tow vehicle.

* * * * *